(12) United States Patent
Cooper et al.

(10) Patent No.: US 8,662,003 B1
(45) Date of Patent: Mar. 4, 2014

(54) WIRE LEVEL GAUGE

(76) Inventors: Edward L. Cooper, Clarklake, MI (US);
Brent M. Cooper, Kennesaw, GA (US)

( * ) Notice: Subject to any disclaimer, the term of this patent is extended or adjusted under 35 U.S.C. 154(b) by 99 days.

(21) Appl. No.: 13/479,947

(22) Filed: May 24, 2012

Related U.S. Application Data

(60) Provisional application No. 61/490,718, filed on May 27, 2011.

(51) Int. Cl.
*G01D 5/12* (2006.01)
*G01C 5/00* (2006.01)
*B65H 43/00* (2006.01)
*B65H 63/00* (2006.01)

(52) U.S. Cl.
USPC ........... 116/201; 116/200; 116/204; 242/563; 242/912

(58) Field of Classification Search
None
See application file for complete search history.

(56) References Cited

U.S. PATENT DOCUMENTS 7,340,953 B2 * 3/2008 Green et al. ............... 73/428
7,449,660 B2 * 11/2008 Albrecht et al. .......... 219/137.2

OTHER PUBLICATIONS

Web page from website www.wire-wizard.com owned by ELCo Enterprises, Inc. dated Jul. 2010.

* cited by examiner

*Primary Examiner* — Leonard Chang
*Assistant Examiner* — Irving A Campbell
(74) *Attorney, Agent, or Firm* — Mary M. Moyne; Fraser Trebilcock

(57) ABSTRACT

A wire level gauge for indicating the level of wire in a wire storage container and a method for determining the level of wire in a wire storage container using the wire level gauge. The wire level gauge has a level indicator with a magnet which is slidably movable on a measuring bar. The level indicator moves on the measuring bar and follows a leading edge of the wire in the wire storage container as the wire is dispensed from the wire storage container.

15 Claims, 4 Drawing Sheets

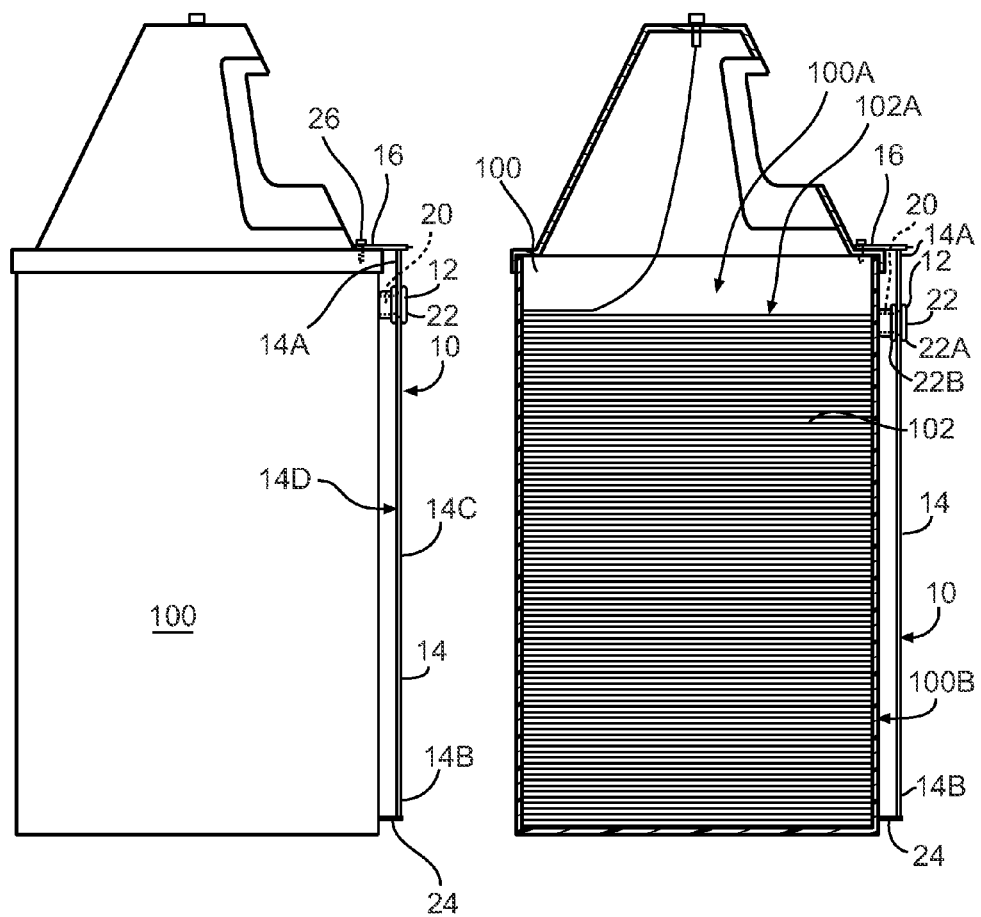

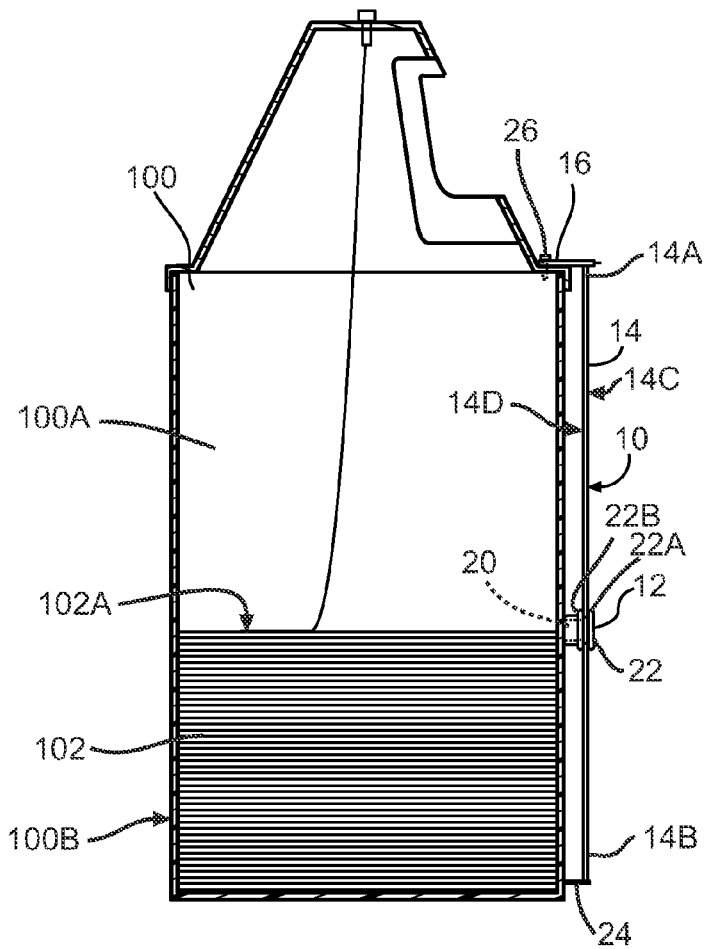
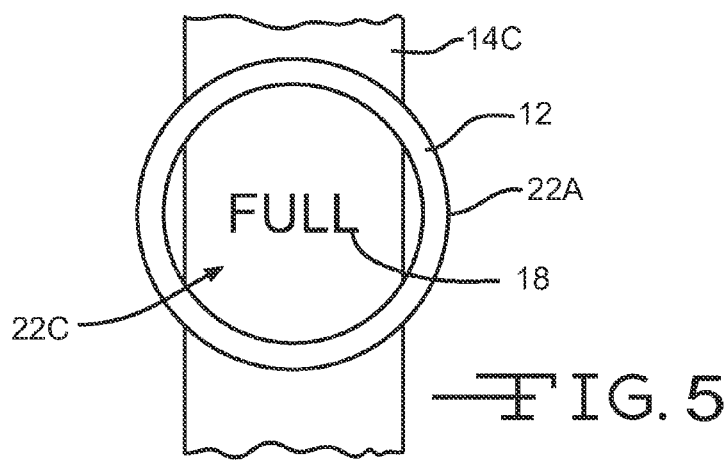

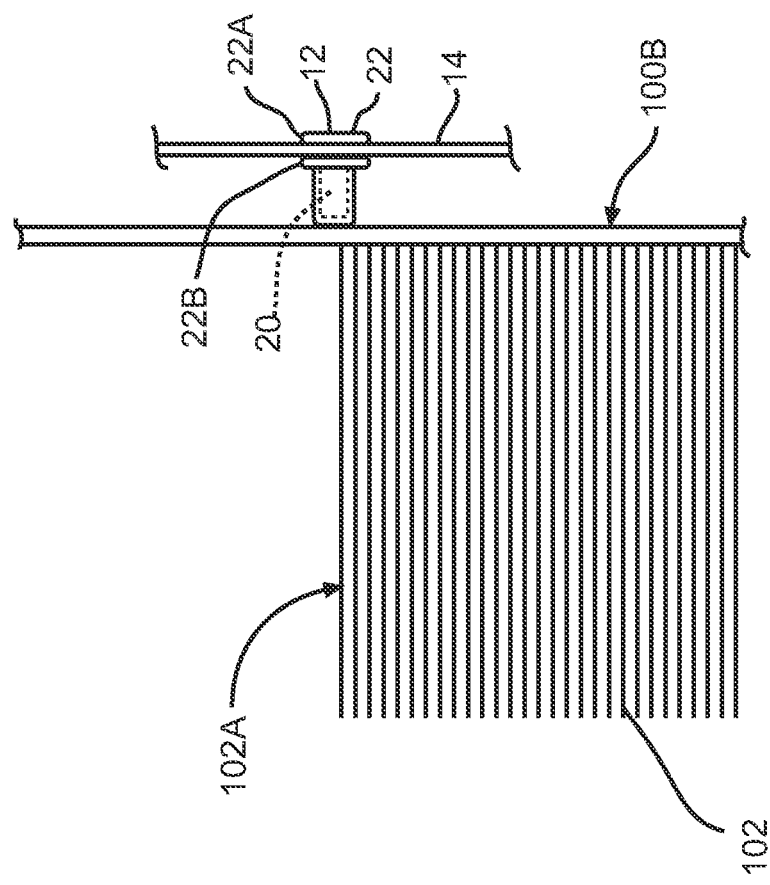

WIRE LEVEL GAUGE

CROSS REFERENCES TO RELATED APPLICATIONS

This application claims the benefit of U.S. Provisional Application No. 61/490,718 filed May 27, 2011 which is hereby incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable.

BACKGROUND OF THE INVENTION

Field of the Invention

The present invention relates to a wire level gauge for determining the amount of wire in a wire storage container. In particular, the present invention relates to a wire level gauge which uses a level indicator having a magnet which slides along a measuring bar to indicate a level of the wire in the wire storage container. Further, the present invention relates to a method for determining the amount of wire in a wire storage container by using a wire level gauge which moves along the outer surface of the wire storage container.

BRIEF SUMMARY OF THE INVENTION

A wire level gauge for determining the level or amount of wire in a wire storage container. The wire level gauge includes a measuring bar and a level indicator having a magnet. The measuring bar has opposed ends with front and back surfaces extending therebetween. At least the front surface of the measuring bar is provided with level indicating indicia. The level indicator is slidably mounted on the measuring bar and moves along the length of the measuring bar between the ends of the measuring bar. In one (1) embodiment, the level indicator has a housing with a first section and a second section. The level indicator is mounted on the measuring bar such that the first section is adjacent one surface of the measuring bar and the second section is adjacent the opposite surface of the measuring bar. In one (1) embodiment, the first section of the level indicator has an opening or viewing area which allows a user to view the indicia on the surface of the measuring bar beneath the level indicator. The magnet is mounted in the second section of the level indicator. The level indicator is mounted on the measuring bar so that the second section with the magnet is adjacent the outer surface of the wire storage container and the first section is viewable by a user.

The wire level gauge is mounted at one end by a bracket to the top of the wire storage container. The bracket is movably mounted to the wire level gauge so that the wire level gauge can be removed and rotated so that the opposite surface of the measuring bar can be viewed such that a different set of level indicating indicia are viewable through the first section of the level indictor. The versatility of the measuring bar and the detachable bracket allows the wire level gauge to be used with different sized wire storage containers.

The wire level gauge is mounted to the wire storage container so that the measuring bar extends along an outer surface of the were storage container from essentially the top of the wire storage container to essentially the bottom of the wire storage container. As the wire is dispensed from the inner chamber of the wire storage container, a leading edge of the wire moves downward. The magnetic attraction between the magnet of the level indicator and the ferromagnetic material of the wire moves the level indicator along the measuring bar as the level indicator follows the leading edge of the wire. As the level indicator moves along the measuring bar, the level indicating indicia visible through or adjacent to the level indicator shows the level or amount of wire in the wire storage container based on the level or height of the leading edge of the wire.

The present invention relates to gauge for measuring an amount of wire in a wire storage container including a measuring bar adapted to be mounted adjacent an outer surface of the wire storage container and a level indicator slidably mounted on the measuring bar and having a magnet.

Further, the present invention relates to a method for measuring a level of wire in an inner chamber of a wire storage container having a wall, the wire being constructed of a ferromagnetic material, which comprises the steps of providing a wire level gauge having a measuring bar having opposed ends with a level indicator having a magnet slidably mounted on the measuring bar between the ends, mounting the wire level gauge on the wire storage container such that the magnet of the level indicator is adjacent the wall of the wire storage container on a side opposite the wire in the inner chamber of the wire storage container, and positioning the level indicator adjacent a first edge of the wire so that as the wire is dispensed from the wire storage container, the first edge of the wire moves and the level indicator moves along the measuring bar due to a magnetic attraction between the magnet of the level indicator and the wire.

The substance and advantages of the present invention will become increasingly apparent by reference to the following drawings and the description.

BRIEF DESCRIPTION OF THE DRAWINGS

FIG. 2 is a side view of the wire level gauge 10 mounted on the wire storage container 100 showing the level indicator 12 mounted on the measuring bar 14.

FIG. 3 is a cross sectional side view of a wire storage container 100 showing the inner chamber 100A of a wire storage container 100 essentially full of wire 102 with the level indicator 12 at the top end 14A of the measuring bar 14 adjacent the leading edge 102A of the wire 102.

FIG. 4 is a side view of a wire storage container 100 showing the inner chamber 100A of a wire storage container 100 essentially less than half full of wire 102 with the level indicator 12 adjacent the leading edge 102A of the wire 102.

FIG. 5 is a partial view of the wire level gauge 10 showing a portion of the measuring bar 14 with the level indicator 12 and showing the level indicating indicia 18 on the front surface 14C of the measuring bar 14.

FIG. 6 is a partial view of the wire level gauge 10 showing the level indicator 12 mounted on the measuring bar 14 and the magnet 20 mounted in the second section 22B of the housing 22 of the level indicator 12.

DETAILED DESCRIPTION OF THE INVENTION

Figure 1:
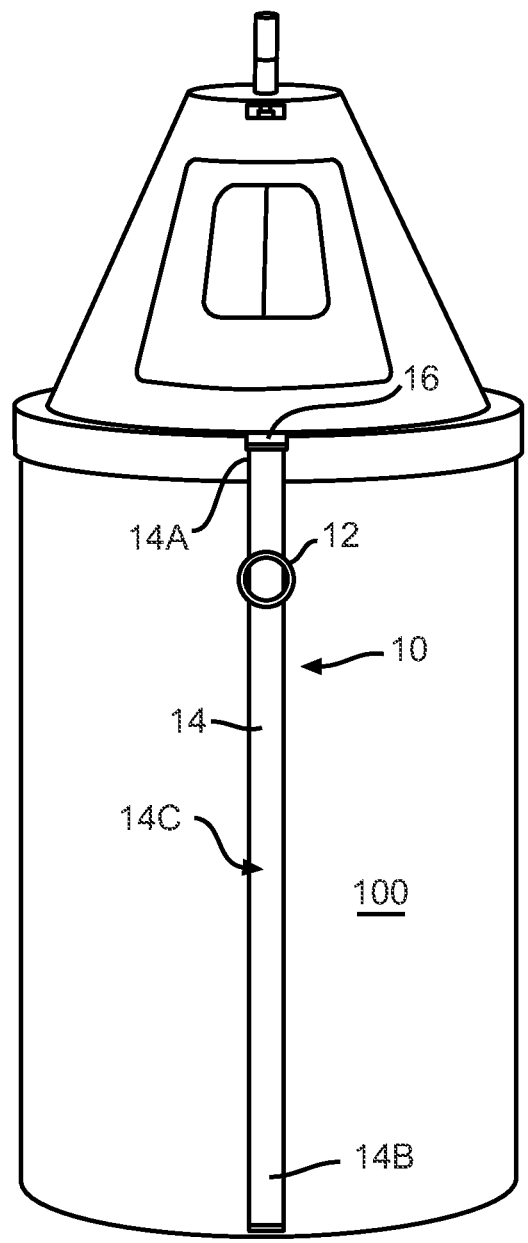
FIG. 1 is a front view of the wire level gauge 10 mounted on a wire storage container 100.

A wire level gauge 10 for indicating a level or amount of wire 102 in a wire storage container 100. The wire storage container 100 includes an inner chamber 100A with at least one wall or side surrounding the inner chamber 100A. The wire 102 is stored in the inner chamber 100A. In one (1) embodiment, the wall or side of the wire storage container 100 is essentially opaque such that the level of wire 102 in the inner chamber 100A of the wire storage container 100 is not easily viewable. In one (1) embodiment, the wall or side of the wire storage container 100 is constructed of a non-ferrous material. In one (1) embodiment, the wall or side of the wire storage container 100 is constructed of a material that will not attract the magnet 20 of the wire level gauge 10. In one (1) embodiment, the wall or side of the wire storage container 100 is constructed of cardboard or a thin plastic material. The wire storage container 100 allows for storing and dispensing the wire 102. In one (1) embodiment, the wire storage container 100 is a drum having an essentially cylindrical shape with the wire 102 dispensed from a top of the drum. In another embodiment, the wire storage container 100 is a box having a non-circular cross sectional shape. However, it is understood that the wire storage container 100 can be any type of wire storage container well-known in the art. In one (1) embodiment, the wire 102 is constructed of or includes a ferromagnetic material. In one (1) embodiment, the wire 102 is used for welding.

The wire level gauge 10 of the present invention includes a level indicator 12 slidably mounted on a measuring bar 14. The measuring bar 14 has opposed top and bottom ends 14A and 14B with a front surface 14C and back surface 14D extending thereafter. The measuring bar 14 can have a variety of shapes and sizes. In one (1) embodiment, the measuring bar 14 has a cylindrical shape. In one (1) embodiment, the measuring bar 14 is essentially flat and straight and has an essentially rectangular shape. In one (1) embodiment, the measuring bar 14 has a length essentially equal to a height of the wire storage container 100. In one (1) embodiment, the measuring bar 14 has a length essentially equal to a width or length of the wire storage container 100. In one (1) embodiment, the front surface 14C of the measuring bar 14 has level indicating indicia 18 indicating the amount of wire 102 in the wire storage container 100 relative to a vertical position on the measuring bar 14. In one (1) embodiment, both the front and back surfaces 14C and 14D of the measuring bar 14 have level indicating indicia 18. In the one (1) embodiment, where the measuring bar 14 has level indicating indicia 18 on both the front and back surfaces 14C and 14D, the level indicating indicia 18 are positioned so that the full position of the measuring bar 14 or the level indicating indicia 18 identifying the full position is the same for both the front and back surfaces 14C and 14D. In one (1) embodiment, the level indicating indicia 18 indicating the full level of wire 102 is adjacent the top end 14A of the measuring bar 14. In one (1) embodiment, where the wire storage container 100 is a drum, the front surface 14C has level indicating indicia 18 for a drum storing 1000 pounds of wire 102, and the back surface 14D has level indicating indicia 18 for a drum storing 500 pounds of wire 102. In one (1) embodiment, the level indicating indicia 18 has varying colors to indicate different levels or amounts of wire 102 to enable easier and quicker identification of the level of wire 102 in the wire storage container 100. In one (1) embodiment, the level indicating indicia 18 indicate the level or amount of wire 102 using percentages to indicate the percentage of the total amount of wire 102 that remains in the wire storage container 100.

The wire level gauge 10 can be mounted to or attached to the wire storage container 100 by any means well-known in the art. In one (1) embodiment, the wire level gauge 10 is attached to the wire storage container 100 by a strap (not shown). In one (1) embodiment, a bracket 16 is provided for mounting the wire level gauge 10 to the wire storage container 100. In one (1) embodiment, the bracket 16 is mounted at the top end 14A of the measuring bar 14. In one (1) embodiment, the bracket 16 is slidably mounted on the measuring bar 14 to allow for varying the position of the measuring bar 14 along the height of the wire storage container 100. In one (1) embodiment, a removeable pin 26 is used to secure the bracket 16 to the wire storage container 100 so that the wire level gauge 10 can be easily removed and relocated to another wire storage container 100 once the first wire storage container 100 is empty. In one (1) embodiment, the measuring bar 14 has holes which allow for mounting the bracket 16 at different positions along the measuring bar 14 to enable the wire level gauge 10 to be used with a variety of different sized wire storage containers 100. In one (1) embodiment, a spacer 24 is provided at a bottom end 14B of the measuring bar 14 opposite the bracket 16 to keep the bottom end 14B of the measuring bar 14 spaced apart from the outer surface 100B of the wire storage container 100.

The level indicator 12 is slidably mounted on the measuring bar 14 and has a magnet 20. The level indicator 12 can have a variety of shapes and sizes which enable the level indicator 12 to move on the measuring bar 14 and to indicate the amount of wire 102 in the wire storage container 100. In one (1) embodiment, the level indicator 12 is a pointer mounted on the magnet 20. In one (1) embodiment, the level indicator 12 includes a housing 22 which holds the magnet 20. In one (1) embodiment, the housing 22 includes a first section 22A spaced apart from a second section 22B. In one (1) embodiment, the width of the space between the first and second section 22A and 22B is greater than the thickness of the measuring bar 14. The level indicator 12 is mounted on the measuring bar 14 so that the first section 22A of the housing 22 is adjacent the front or back surface 14A or 14B of the measuring bar 14, and the second section 22B of the housing 22 is adjacent the opposite back or front surface 14B or 14A of the measuring bar 14. Thus, the measuring bar 14 is sandwiched between the first and second sections 22A and 22B of the housing 22 of the level indicator 12. The space between the first and second sections 22A and 22B is of such a size as to enable the level indicator 12 to easily and freely move and slide along the measuring bar 14. The first section 22A of the housing 22 has an opening 22C to enable a user to view the level indicating indicia 18 on the measuring bar 14 through the level indicator 12 to read the level indicating indicia 18 on the measuring bar 14 (FIG. 5). In one (1) embodiment, the first section 22A of the housing 22 has a center opening for viewing the measuring bar 14. In one (1) embodiment, the first section 22A of the housing 22 has a circular shape with a circular opening in the center. The magnet 20 is mounted in the second section 22B of the housing 22. In one (1) embodiment, the second section 22B completely surrounds the magnet 20 except for a portion of the magnet 20 opposite the first section 22A of the housing 22 and the measuring bar 14. In one (1) embodiment, the second section 22B of the housing 22 forms a spacer between the magnet 20 and the outer surface 100B of the wall of the wire storage container 100 (FIG. 6). In one (1) embodiment, the level indicator housing 22 is constructed of plastic. However, it is understood that the level indicator housing 22 can be constructed of any durable material well-known in the art. The strength of the magnet 20 is selected such that the magnet 20 will be attracted to the wire 102 in the inner chamber 100A of the wire storage container 100 through the wall or side of the wire storage container 100. However, the strength of the magnet 20 is such that the magnet 20 will slide along the wall of the wire storage container 100 as the leading edge 102A of the wire 102 moves in the wire storage container 100.

To mount the wire level gauge 10 on the wire storage container 100, the bracket 16 on the measuring bar 14 is attached to the wire storage container 100 so that the measuring bar 14 extends along the wall or side of the wire storage container 100. In one (1) embodiment, the bracket 16 is attached to the top of the wire storage container 100 and the measuring bar 14 extends downward along the wall or side of the wire storage container 100 toward the bottom of the wire storage container 100. In one (1) embodiment, the wire level gauge 10 is mounted on the wire storage container 100 so that the measuring bar 14 has a vertical orientation. In one (1) embodiment, the wire level gauge 10 is mounted on the wire storage container 100 such that the back surface 14D or front surface 14C of the measuring bar 14 is adjacent to and spaced apart from an outer surface 100B of the wall or side of the wire storage container 100 opposite the inner chamber 100A and the wire 102. Whether the measuring bar 14 is mounted with the front surface 14C or back surface 14D adjacent the wire storage container 100 depends on the size or storage capacity of the wire storage container 100 such that the correct level indicating indicia 18 are visible through the housing 22 of the level indicator 12 or adjacent to the level indicator 12. The measuring bar 14 is mounted so that the level indicating indicia 18 are visible through the opening 22C in the level indicator 12 or visible adjacent the level indicator 12 and the level indicating indicia 18 correspond to the size or capacity of the wire storage container 100. In one (1) embodiment, the bracket 16, level indicator 12 and spacer 24 can be removed from the measuring bar 14 and reattached to the measuring bar 14 after the measuring bar 14 has been positioned to reveal the correct level indicating indicia 18. In one (1) embodiment, the level indicator 12 is positioned on the measuring bar 14 prior to mounting the wire level gauge 10 on the wire storage container 100. In one (1) embodiment, the wire level gauge 10 is mounted on the wire storage container 100 so that the second section 22B of the housing 22 is adjacent to and in contact with the outer surface 100B of the wire storage container 100. In one (1) embodiment, the second section 22B of the housing 22 of the level indicator 12 is spaced apart from but adjacent to the outer surface 100B of the wire storage container 100. In one (1) embodiment, the wire level gauge 10 is mounted on the wire storage container 100 so that the magnet 20 is adjacent to and in contact with the outer surface 100B of the wire storage container 100. In another embodiment, magnet 20 of the level indicator 12 is spaced apart from the outer surface 100B of the wire storage container 100. In one (1) embodiment, the spacer 24 is selected so that the measuring bar 14 remains the correct distance from the outer surface 100B of the wire storage container 100 and the magnet 20 is correctly spaced with regard to the outer surface 100B of the wire storage container 100. In one (1) embodiment, the spacer 24 is adjustable to enable the distance between the measuring bar 14 and the outer surface 100B of the wire storage container 100 to be adjusted. In one (1) embodiment, the second section 22B of the housing 22 provides a spacer between the magnet 20 of the level indicator 12 and the outer surface 100B of the wire storage container 100. In one (1) embodiment, the second section 22B of the housing 22 provides a sliding surface between the magnet 20 of the level indicator 12 and the outer surface 100B of the wire storage container 100 which reduces the friction between magnet 20 and the outer surface 100B of the wire storage container 100 and allow the magnet 20 and level indicator 12 to move freely. In one (1) embodiment, the wire 102 is positioned in the wire storage container 100 so that, as the wire 102 is removed from the wire storage container 100, the wire 102 moves from adjacent a top of the wire storage container 100 toward a bottom of the wire storage container 100.

In use, the wire level gauge 10 is mounted on a wire storage container 100 having wire 102. In one (1) embodiment, where the wire storage container 100 has a full load of wire 102, prior to mounting the wire level gauge 10 on the wire storage container 100, the level indicator 12 is moved to the top end 14A of the measuring bar 14 or to the "full" position on the measuring bar 14. If the wire storage container 100 is not full or the "full" position for the wire 102 is not at the top end 14A of the measuring bar 14, then after the wire level gauge 10 is mounted on the wire storage container 100, the level indicator 12 is moved on the measuring bar 14 until the level indicator 12 is adjacent a leading edge 102A of the wire 102. In one (1) embodiment, the level indicator 12 moves along the measuring bar 14 to the leading edge 102A of the wire 102 due to the force of gravity. In one (1) embodiment, the level indicator 12 is moved to the first end 14A of the measuring bar 14 spaced apart form the leading edge 102A of the wire 102. The level indicator 12 is then released and the level indicator 12 automatically moves along the measuring bar 14 to a position adjacent the leading edge 102A of the wire 102 and remains stationary until the leading edge 102A of the wire 102 moves. The magnetic attraction between the magnet 20 of the level indicator 12 and the wire 102 holds the level indicator 12 in position on the measuring bar 14 which allows the user to read the level indicating indicia 18 under or adjacent the level indicator 12 to determine the level of wire 102 in the inner chamber 100A of the wire storage container 100. As the wire 102 is removed from the wire storage container 100, the magnetic attraction between the magnet 20 and the ferromagnetic material in the wire 102 moves the level indicator 12 along the measuring bar 14 following the leading edge 102A of the wire 102, thus indicating on the measuring bar 14 the location of the leading edge 102A of the wire 102 which thus indicates the level or amount of wire 102 in the wire storage container 100. In one (1) embodiment, when there is no wire 102 in the wire storage container 100, the level indicator 12 automatically moves to the second end 14B of the measuring bar 14 adjacent a bottom of the wire storage container 100 due to gravity.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. A gauge for measuring an amount of wire in a wire storage container, which comprises:
   a) a measuring bar adapted to be mounted adjacent an outer surface of the wire storage container;
   b) a level indicator slidably mounted on the measuring bar indicative of the amount of wire in the wire storage container; and
   c) a magnet attached to the level indicator.

2. The gauge of claim 1 wherein the measuring bar has a first end and an opposed second end with a front surface and a back surface extending therebetween.

3. The gauge of claim 2 wherein a bracket is connected to the first end of the measuring bar and wherein, the bracket is adapted to mount to the wire storage container.

4. The gauge of claim 3 wherein the bracket is removably connected to the first end of the measuring bar so that the measuring bar can be removed from the bracket and reattached to the bracket.

5. The gauge of claim 2 wherein a spacer is mounted adjacent the second end of the measuring bar and extends outward from the back surface of the measuring bar in a direction opposite the front surface so that in use, when the measuring bar is mounted on the wire storage container, the spacer extends from the back surface of the measuring bar toward the outer surface of the wire storage container.

6. The gauge of claim 2 wherein the measuring bar has indicia on the front surface and the back surface.

7. The gauge of claim 2 wherein the level indicator has a first section and a second section with a space therebetween and wherein the level indicator is mounted on the measuring bar so that the measuring bar is positioned in the space between the first and second sections of level indicator.

8. The gauge of claim 7 wherein the first section of the level indicator has an opening and wherein when the level indication is mounted on the measuring bar, indicia on the measuring bar are visible through the opening.

9. The gauge of claim 7 wherein the magnet is mounted in the second section of the level indicator on a side of the measuring bar opposite the first section of the level indicator.

10. The gauge of claim 9 wherein the second section of the level indicator completely surrounds the magnet except for an opening on a side opposite the first section and wherein, the second section of the level indicator provides a sliding surface adjacent a side of the magnet opposite the measuring bar.

11. The gauge of claim 7 wherein a width of the space between the first and second sections of the level indicator is greater than a thickness of the measuring bar so that the level indicator moves freely on the measuring.

12. A method for measuring a level of wire in an inner chamber of a wire storage container having a wall, the wire being constructed of a ferromagnetic material, which comprises the steps of:
   a) providing a wire level gauge having a measuring bar having opposed ends with a level indicator having a magnet slidably mounted on the measuring bar between the ends;
   b) mounting the wire level gauge on the wire storage container such that the magnet of the level indicator is adjacent the wall of the wire storage container on a side opposite the wire in the inner chamber of the wire storage container; and
   c) positioning the level indicator adjacent a leading edge of the wire so that as the wire is dispensed from the wire storage container, the leading edge of the wire moves and the level indicator moves along the measuring bar due to a magnetic attraction between the magnet of the level indicator and the wire.

13. The method of claim 12 wherein the measuring bar has a first end and a second end, wherein the wire storage container has a top and a bottom and the wire is dispensed from the top, wherein further in step (b), the wire level gauge is mounted so that the first end of the measuring bar is adjacent the top of the wire storage container and wherein further in step (c), as the wire is dispensed, a height of the leading edge of the wire in the wire storage container moves toward the bottom of the wire storage container and the level indicator moves toward the second end of the measuring bar.

14. The method of claim 12 wherein the measuring bar has a first end and a second end, wherein the wire storage container has a top and a bottom and the wire is dispensed from the top, wherein in step (b), the wire level gauge is mounted on the wire storage container with the measuring bar in a vertical orientation with the first end adjacent the top of the wire storage container, and wherein, the level indicator is freely slidable on the measuring bar so that further in step (c), when no wire is located in the wire storage container, the level indicator automatically moves to the second end of the measuring bar adjacent the bottom of the wire storage container due to a force of gravity.

15. The method of claim 12 wherein the measuring bar has first and second ends and is positioned so that the first end is adjacent the leading edge of the wire, the level indictor is freely movably on the measuring bar, wherein further in step (c), the level indicator is moved to the end of the measuring bar adjacent and spaced apart from the leading edge of the wire and is released and wherein the level indicator moves along the measuring bar until the level indicator is adjacent the leading edge of the wire and then the level indicator stops until the leading edge of the wire moves.

\* \* \* \* \*